United States Patent

[11] 3,599,864

[72] Inventor David E. Liddle
Toledo, Ohio
[21] Appl. No. 861,803
[22] Filed Sept. 29, 1969
[45] Patented Aug. 17, 1971
[73] Assignee Permaglass Inc.
Millbury, Ohio

[54] CONTROL SYSTEM WITH VARIABLE PULSE RATE
10 Claims, 9 Drawing Figs.

[52] U.S. Cl. .................................................. 236/78,
219/492, 236/46, 332/2
[51] Int. Cl. .................................................. G05b 11/30,
G05d 23/22
[50] Field of Search .......................................... 236/75, 78,
78 D, 46 F; 332/2; 219/492, 514; 307/310, 265,
266; 317/133.5

[56] References Cited
UNITED STATES PATENTS
| | | | |
|---|---|---|---|
| 3,149,293 | 9/1964 | Farkas.......................... | 236/46 X |
| 3,509,322 | 4/1970 | Lundin.......................... | 219/492 X |

*Primary Examiner*—William E. Wayner
*Attorney*—Barnard, McGlynn & Reising

ABSTRACT: A feedback control system of the proportional type is disclosed wherein a pulse width modulator is employed which exhibits both variable gain and variable pulse rate characteristics. The system includes means for producing an error voltage corresponding to the deviation of the variable quantity from a desired value and means for developing a carrier voltage which in combination with the error voltage effectively produces a modulator output pulse rate which increases as the error voltage decreases. The carrier voltage may be derived from a gaussian random noise source or may be developed by a variable frequency oscillator. The system is especially adapted for use where the control device includes a mechanical contactor wherein it is desired to limit the cycling of the contactor and still obtain the desired degree of control. A typical application is in temperature control systems for glass-treating furnaces

PATENTED AUG 17 1971

INVENTOR
David E. Liddle
BY
Barnard, McGlynn & Reising
ATTORNEYS

INVENTOR.
David E. Liddle
BY
Barnard, McGlynn & Reising
ATTORNEYS

CONTROL SYSTEM WITH VARIABLE PULSE RATE

This invention relates to control systems and more particularly feedback control systems of the proportional type using pulse width modulation techniques.

In feedback control systems it is common practice to use a pulse width modulator for producing control voltages having a pulse duration corresponding to the error voltage of the system; i.e., the departure of the value of the controlled variable quantity from the desired value or set point value. Such control pulses are utilized to operate an on-off type control device so that its on time is related to the error voltage and hence, the deviation of the controlled quantity from the desired value. In such systems the switching voltage for the modulator may be produced by combining the error voltage and a periodic carrier voltage which is generated especially for establishing pulse or switching rates which, in general, are much higher than the rate of variation of the error voltage. In such a system the pulse duration of the modulator output varies in accordance with the time that the switching signal exceeds a predetermined amplitude and thus is relatively large for a large error signal and is relatively short for a small error signal. Thus, the pulse width modulator produces an output which is proportional to the size of the error; i.e., the restoring force increases as the error signal increases and thereby causes the controlled variable quantity to change rapidly toward the desired value. It is also a characteristic of the prior art systems, in consequence of the use of a fixed periodic carrier voltage, to produce a controlled pulse rate which is substantially constant over the entire proportional band of the control system. It is quite common, for example, to utilize in such systems a carrier voltage which is a periodic linear function of time. Also the carrier voltage may be a nonlinear function to produce a variable gain characteristic. Consequently, the pulse rate produced by the pulse width modulator will have a value corresponding to the frequency of the carrier voltage and will remain the same for both small and large error voltages. Relatively high pulse rate and high gain are desirable when the error voltage is of small value; i.e., as the controlled variable quantity closely approaches or becomes equal to the desired value because it affords a higher degree of sensitivity and maintains the error within close limits about the desired value. However, the high pulse rate when the error voltage is large serves no useful purpose and, in fact, in some applications it is detrimental to the control system.

In certain control systems using pulse width modulation techniques it is desirable to produce a pulse rate which varies in accordance with the value of the error; at the same time it is desirable to retain the advantages of variable gain and proportional control as referred to above. Among such applications are those in which the controlled system or process is characterized by a relatively slowly varying controlled quantity. In such systems a correction may be by relatively low switching rates throughout the proportional band. An example of such a control system is that of heat or temperature control wherein the temperature variation is of such a slow rate that mechanical contactors may be utilized with advantage as the on-off device for energizing the heat source. In furnaces for treating glass it is common to utilize electric resistance heaters which are energized through mechanical contactors which may take the form of electromagnetically actuated mercury switches which are capable of handling high values of electrical power. Such contactors are typically adapted for operation at a rate of 1 cycle per second or less. Furthermore, they have a useful life which is generally determined by the number of cycles of operation and, therefore, for reasons of economy it is desired to obtain a desired control without an unnecessarily large number of cycles of operation.

Accordingly, it is an object of this invention to provide a control system which produces control pulses having a repetition rate which varies in accordance with the deviation of the controlled variable quantity from the desired value. In general, this is accomplished in accordance with the invention by means of a carrier voltage which is effective in combination with the error voltage to produce a higher pulse rate as the error voltage decreases.

A further object of this invention is to provide a control system of the type using pulse width modulation techniques wherein the modulator exhibits both variable gain characteristics and variable pulse rate characteristics. This is accomplished by the use of a carrier voltage which is characterized by an increasing number of excursions beyond the value of the error voltage as the error signal decreases.

A more particular object of the invention is to provide a pulse width modulator for use in control systems and the like which exhibits a variable pulse rate characteristic which is obtained by the use of a random noise source as the source of carrier voltage.

Another object of the invention is to provide a control system utilizing a pulse width modulator with a switching voltage including a carrier voltage derived from a random noise source having a gaussian amplitude distribution and a substantially flat or uniform spectral density.

A further object of the invention is to provide a control system of the type utilizing a pulse width modulator with a switching voltage including a carrier voltage of gaussian random amplitude distribution and substantially flat or uniform spectral density below a predetermined cutoff frequency.

A further object of the invention is to provide a control system with a pulse width modulator having a switching voltage of gaussian random amplitude distribution and derived from the inherent noise in the control system such as the thermocouple in a temperature measuring system.

An additional object of the invention is to provide a pulse width modulation system for use in control systems which exhibits a variable pulse rate characteristic produced by a variable frequency oscillator as the source of carrier voltage.

According to the invention there is provided a feedback control system of the type including a pulse width modulator adapted to respond to a switching voltage for producing control pulses having a duration corresponding to the time the switching voltage exceeds a reference amplitude. The system includes means for producing an error voltage corresponding to the deviation of the value of a variable quantity from a desired value and means for developing a carrier voltage which in combination the error voltage effectively produces a modulator output pulse rate which increases as the error voltage decreases. This may be accomplished by the use of a carrier voltage derived from a random noise source having a gaussian amplitude distribution or it may be derived from a variable frequency oscillator. A signal voltage, corresponding to the variable quantity, and a set point voltage which corresponds to the desired value of the variable quantity are combined and effectively compared with the carrier to cause switching of the pulse width modulator.

A more complete understanding of the invention may be had from the detailed description which follows taken with the accompanying drawings in which.

Figure 1:
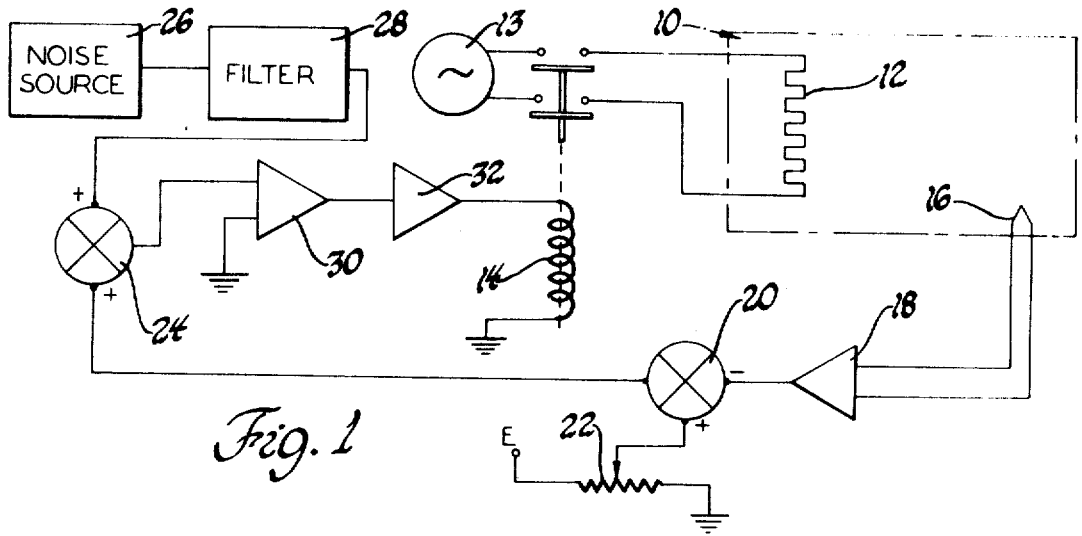
FIG. 1 is a diagrammatic representation of a temperature control system embodying the invention.

Referring now to the drawings, there is shown an illustrative embodiment of the invention in a feedback control system especially adapted for temperature control. The illustrative embodiment is particularly adapted for regulating the temperature of relatively large glass-treating furnaces at a substantially constant value. The control system is a feedback control system of the proportional type utilizing pulse width modulation techniques.

Referring now to FIG. 1, there is shown a control system for a furnace 10 which is adapted to receive workpieces such as glass sheets and to maintain a substantially constant high temperature. The furnace 10 includes an electrical resistance heating element 12 which is energized from an alternating current source 13 through a control device in the form of an electromechanical switch or contactor 14. The contactor is suitably of the multiple-pole single-throw type actuated by an electromagnet to a closed position and actuated to an open position by a return spring.

The temperature in the furnace 10 which constitutes the variable quantity to be controlled, is measured by a sensing means such as thermocouple 16 disposed within the furnace. The thermocouple 16 develops a signal voltage which has a magnitude corresponding to the value of the temperature within the furnace. Since the temperature of the furnace, which is relatively large and massive with a high heat capacity, will vary slowly as a function of time in accordance with changes in loading and disturbances of various kinds, the thermocouple voltage will also be a slowly varying function of time. The signal voltage from the thermocouple is applied to an amplifier 18 which will produce an output voltage of a few millivolts in amplitude. The amplified signal voltage is applied to one input of an adder 20 which will be described in more detail presently.

In order to provide a reference or set point voltage corresponding to the desired value of the controlled temperature there is provide a potentiometer 22, suitably of the resistance type. It is excited with a fixed reference voltage E and produces an adjustable output voltage on the movable contact thereof which is connected to another input of the adder 20. The adder 20 is a conventional circuit for producing an output voltage corresponding to the algebraic sum of two input voltages. It is noted that the relative polarity of the input voltages from the amplifier 18 and the potentiometer 22 are indicated as being negative and positive respectively. The output of the adder 20 is an error voltage which has a magnitude corresponding to the difference between the desired temperature in the furnace 10, as represented by the set point voltage, and the actual temperature in the furnace 10, as represented by the signal voltage from the thermocouple. The error voltage from the adder 20 has a polarity which corresponds to the direction of deviation of the actual temperature from the desired temperature.

In order to develop an actuating or switching voltage, there is provided another adder 24 having one input connected with the output of the adder 20 and another input which is connected with the output of a carrier voltage source. The carrier voltage source includes a noise source 26, which will be described in more detail subsequently. It has a gaussian random amplitude distribution with an average amplitude value of zero. Additionally, the noise source has a power spectral density of substantially uniform distribution and may have the same spectral characteristic as white noise. The output of the noise source 26 is applied to a low-pass filter 28 which is effective to reject components of the noise voltage above a desired frequency which, for use in a temperature control system of the type described, is suitably 1 cycle per second. The output of the filter 28 is connected to the other input of the adder 24 to apply the carrier voltage thereto. The adder 24 produces an output switching voltage which corresponds to the algebraic sum of the error voltage and the carrier voltage which are applied to its input terminals.

In order to develop a control which corresponds to the value of the error voltage, there is provided a pulse width modulator 30. The pulse width modulator has one input connected with the output of the adder 24 and thus is responsive to the switching or actuating voltage thereof. The other input of the modulator 30 is connected to a point of reference potential or ground as indicated. The pulse width modulator suitably takes the form of a comparator which will accept two inputs and produce a single two-state output. The comparator in a well-known embodiment is a differential or operational amplifier operated in an open-loop mode with a high gain. When the switching voltage from the adder 24 on the first input is greater than the reference voltage on the second input, the modulator 30 produces a first predetermined output voltage; when the switching voltage is less than the reference voltage the modulator produces a second predetermined output voltage, suitably zero. Thus, the pulse width modulator 30 operates as an "on-off" device in which the "on" condition is produced by a switching signal greater than the reference voltage and the "off" condition is produced by a switching signal of zero or a value less than the reference voltage. The output of the pulse width modulator is a train of pulses each of which has a pulse width determined by the on period and an interval between pulses corresponding to the off period of the switching voltage. The output of the pulse width modulator is applied to the input of an amplifier 32 which suitably takes the form of an emitter follower amplifier adapted to provide current gain. The output of the amplifier 32 is connected directly to the energizing winding of the contactor 14. By this arrangement the contactor is actuated between open and closed positions in accordance with the pulses produced by the pulse width modulator 30.

Figure 3A:
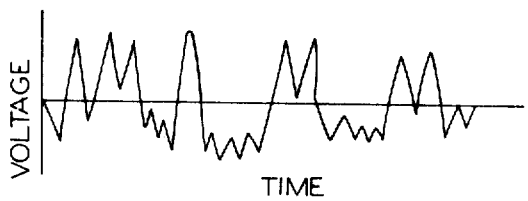
FIGS. 3a, 3b and 3c are graphical representations of certain characteristics of a random noise source.

Before s description of operation is given with reference to the system of FIG. 1, it will be helpful to consider the noise source 26 as a carrier wave in greater detail. The noise source 26 has a gaussian random amplitude distribution and has time average amplitude of zero. It will be appreciated, as the description proceeds, that random amplitude distribution other than gaussian random may be employed. However, it will be recognized that the gaussian distribution of voltage amplitude is most readily available. There are a variety of gaussian random noise sources available which would be suitable for use in the present invention, most of which rely upon the amplification of the shot noise in electronic devices such as vacuum tubes or semiconductors. One such noise suitable for use in the present invention is the Model 1602A Noise Source Module supplied by Elgenco Incorporated of Santa Monica, Calif. Another such noise source is type 1390-A Random Noise Generator available from the General Radio Company. Referring now to FIG. 3a, there is a graphical representation of a voltage waveform as a function of time which represents a gaussian random amplitude distribution. The spectral density of the output of such a noise source is substantially uniform over a wide frequency range in a manner similar to white noise. The waveform illustrated in FIG. 3a as being representative of the carrier voltage component in the switching voltage for the pulse width modulator 30 is of limited bandwidth by reason of the low pass filter 28. The filter desirably rejects frequencies below approximately 1 cycle per second and, therefore, it may be said that the spectral density is substantially uniform up to the cutoff frequency which is preferably selected in accordance with the response characteristics of the system to be controlled.

Figure 3B:
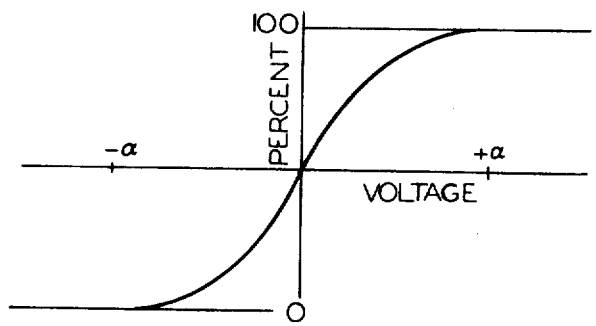

Considering the noise voltage waveform of FIG. 3a as the carrier voltage in a pulse width modulation system, reference is made to FIG. 3b which graphically represents the amplitude distribution function of the waveform of FIG. 3a. This function is of significance in that the gain characteristic or the input-output relationship of a pulse width modulator is identically equal to the amplitude distribution function of the modulation waveform. This function shows the percentage of time that the value of the random waveform is less than a certain voltage. The peak amplitude of the waveform will practically never exceed two times the root mean square value of the voltage waveform of FIG. 3a. As illustrated in FIG. 3b, the waveform has a value less than $-a$ 0 percent of the time and the waveform has a value less than $+a$ 100 percent of the time. It is also noted that 50 percent of the time the waveform has a value less than zero and, of course, it follows that the remaining 50 percent of the time it has a value greater than zero and, therefore, it must have a mean value of zero. It can be seen from FIG. 3b that with a carrier wave exhibiting such an amplitude distribution and an error voltage of slowly varying magnitude which is combined therewith to develop a switching voltage for a pulse width modulator, the modulator will exhibit a variable gain characteristic. In particular, the error voltage may be considered as establishing the value of voltage along the abscissa in FIG. 3b and, therefore, determine the percentage of time that the amplitude of the waveform will be below the value of the error voltage. When the error voltage is zero, then the waveform of the carrier voltage will be below that value 50 percent of the time and the output pulse width of the modulator will be relatively small; however, the slope of the distribution curve of FIG. 3b is large and so is the gain. On the other hand, when the error voltage is of large value, for example as it approaches the value of $-a$, the waveform of the carrier voltage will be less than that value only a very small percentage of the time and, consequently, it will exceed that value a large percentage of the time and thus the modulator will produce relatively long pulses. At the same time, the slope of the distribution curve and hence the gain is relatively small. The pulse width modulator exhibits a variable gain characteristic with large values of gain when the error voltage and pulse width are small and vice versa. This, of course, is desirable to produce a fast-acting or high rate of correction and a high degree of sensitivity and accuracy in maintaining the controlled variable quantity at the regulated value.

Figure 3C:
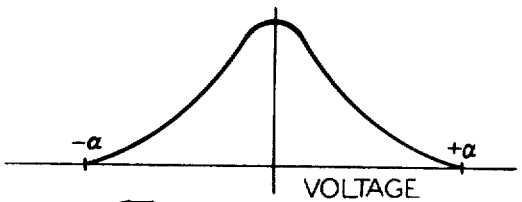

In addition to the variable gain characteristic just discussed, it is also desirable to produce a variable pulse rate in the output of the pulse width modulator. In FIG. 3c there is a graphical illustration of the average pulse rate as a function of the error voltage $a$ for a gaussian random amplitude distribution as illustrated in FIG. 3a. It is noted that the average pulse rate varies as the gaussian distribution curve, i.e., with a very low value when the error voltage is large, and at a maximum value when the error voltage is zero. It will be appreciated that with an error voltage of zero the amplitude variation will undergo a large number of excursions across the zero axis and as the error voltage increases in either a positive or negative direction the number of excursions of the voltage variations thereacross will decrease. Thus, the inherent character of the gaussian random distribution imparts to the carrier voltage and hence the switching voltage, the characteristic which provides a pulse rate variation which increases as the error voltage decreases.

Referring again to FIG. 1, the operation of the system illustrated thereby will be described with reference to FIGURES 2a, 2b and 2c. Assume that it is desired to operate the furnace 10 at a certain set point temperature which is represented by the constant voltage E1 in FIG. 2a. Since the actual temperature in the furnace 10 will vary rather slowly as a function of time and since the carrier voltage produced by the noise source has an amplitude which varies at a much higher rate as a function of time, the operation of the system is illustrated over three successive but interrupted time intervals designated as T1, T2 and T3. In the first time interval the actual temperature is represented by the signal voltage v1 which is developed by the thermocouple 16 and the amplifier 18 and applied to one input of the adder 20. The adder 20 is effective to develop an error voltage e1 which corresponds to the algebraic sum of the set point voltage e1 and the signal voltage v1. The error voltage e 1 is applied as one input to the adder 24, and the carrier voltage from the noise source 26 and filter 28 is applied to the other input of the adder 24. These voltages are additively combined to produce a switching voltage waveform s 1. The switching voltage is applied to the input of the pulse width modulator 26 which has its other input connected to ground. Accordingly, the modulator is switched on when the switching voltage s 1 has a value greater than zero and is switched off when the switching voltage is zero or below. As illustrated in FIG. 2c the modulator produces an output pulse train Pl in a time interval Tl having a relatively long pulse and constant amplitude which corresponds to a relatively large error voltage. The output of the modulator 26 as represented by the pulse train Pl is applied to the input of the power amplifier 32 which in turn energizes the contactor 14. Each pulse causes the contactor of the control device 14 to close the circuit between the alternating current source 13 and the heating element 12 in the furnace 10 to raise the temperature in the furnace and reduce the error voltage accordingly.

Figure 2A:
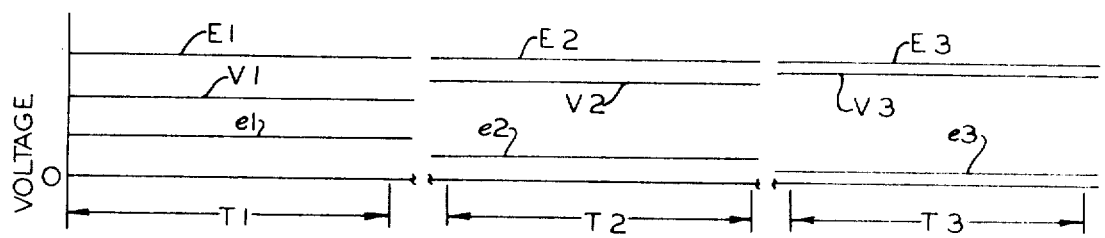
FIGS. 2a, 2b and 2c are graphical representations of the operation of a system embodying the present invention.
Figure 2B:
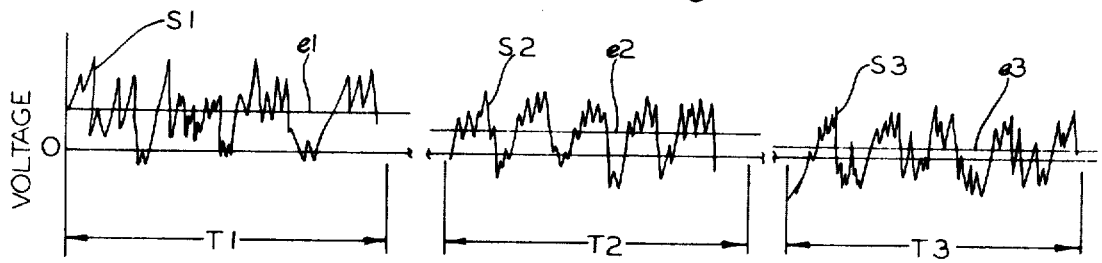
Figure 2C:
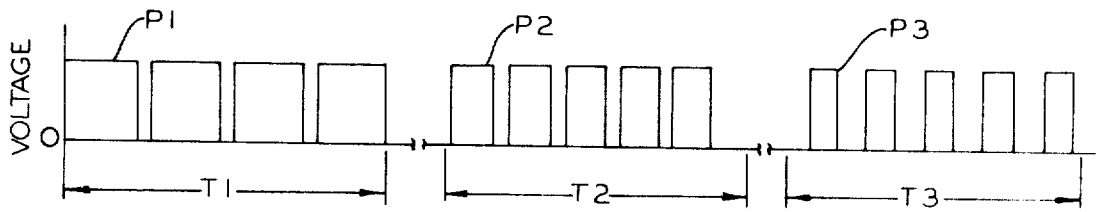

As illustrated in FIGS. 2a, 2b and 2c during the second time interval T2 the signal voltage v2 developed by the thermocouple 16 and the amplifier 18 is increased in magnitude and thus more nearly approaches the value of the set point voltage E2. Accordingly, the error voltage e 2 developed by the adder 20 is reduced and when combined with the carrier voltage from the noise source 26 and filter 28 in adder 24 produces a switching voltage having a waveform s2 as illustrated in FIG. 2b. Since the error voltage is decreased, the switching voltage applied to the modulator 30 will produce a pulse train P2 as indicated in FIG. 2c which has shorter pulses and a higher average pulse rate than that during the period T1. Consequently, the contactor 14 will be energized at a higher frequency to cause the heater 12 to reduce the temperature error towards zero. In the later time interval T3 in FIGS. 2a, 2b and 2c, the signal voltage v3 produced by the thermocouple 16 and amplifier 18 is increased in magnitude and the error voltage e3 of small value. Consequently, when the error voltage e3 is added to the carrier voltage from the noise source 26 and filter 28, the switching voltage from the adder 24 causes the pulse width modulator 30 to produce an output pulse train P3 of shorter pulses and higher average pulse rate. As a result the heater 12 is energized for short intervals of time but at relatively high pulse rate so that the control exhibits a high degree of sensitivity in the vicinity of the desired value of temperature. As the error is further reduced so that the signal voltage is substantially equal to the set point voltage, the switching voltage applied to the input of the modulator will, according to the amplitude distribution function, be greater than the reference voltage 50 percent of the time and less than the reference voltage 50 percent of the time. Accordingly, the output pulse train from the modulator will consist of pulses having a pulse width equal to period between the pulses. In other words, the ratio of on-time to off-time for the heater is unity; the system is appropriately adjusted or designed so that this ratio of on-time to off-time maintains a desired temperature value. This may be accomplished in several ways including the use of proportional plus integral control in the feedback loop, a technique well known to those skilled in the art. Additionally, the system may be designed in the first instance so that the heat input from the heating element 12 is such that it will not exceed the desired temperature when the on-time to off-time ratio is unity.

It will now be appreciated that the illustrative embodiment of the invention in the system of FIG. 1 provides a feedback control system utilizing a pulse width modulator which exhibits both variable gain and variable pulse rate characteristics. This provides a system in which the cycling of the contactor is minimized by reducing the pulse rate when the error is large and also when the error is large pulse width is large and the gain is relatively low. On the other hand, when the error is small the pulse rate is increased, the pulse width is small, and the gain is increased to achieve a high degree of sensitivity and accuracy. This is accomplished in the system of FIG. 1 by use of a carrier voltage source in the form of a noise voltage having an amplitude distribution function which is random and which is preferably gaussian. in this embodiment the carrier source in the form of a random gaussian noise voltage is a separate component of the system. It will be appreciated that the system may utilize other carrier sources in order to produce the variable gain and variable pulse rate characteristics in a pulse width modulator. Examples of two other embodiments of the invention illustrative of other sources will now be described.

Figure 4:
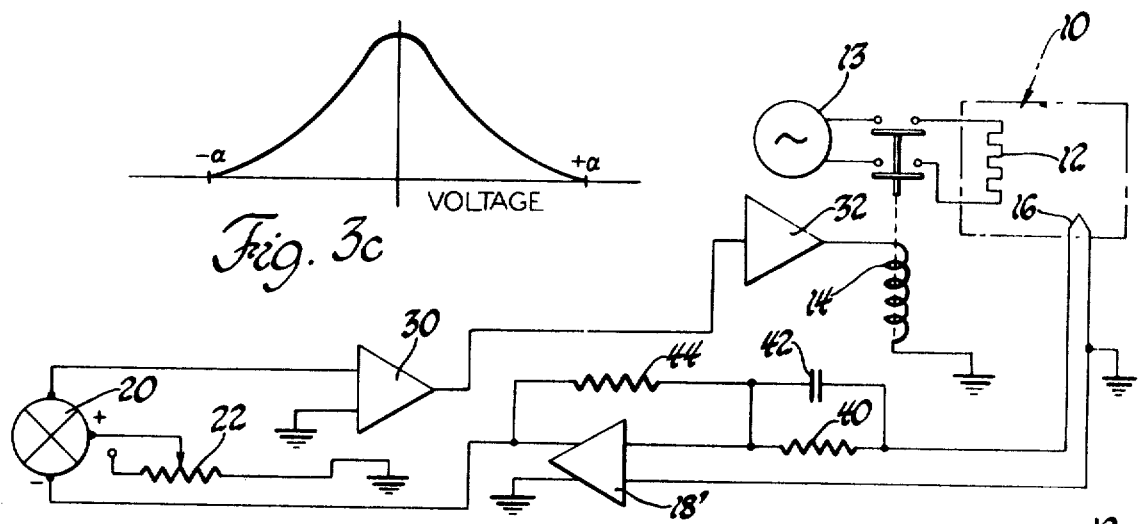
FIG. 4 is a diagrammatic representation of another embodiment of the invention in a temperature control system; and, FIG. 5 is a diagrammatic representation of an additional embodiment of the invention in a temperature control system.

Referring now to FIG. 4 there is shown another embodiment of the invention wherein the carrier voltage is derived from a noise source inherent in the control system and hence there is no need for an external noise source. In this embodiment the control system is adapted to regulate the temperature of a furnace 10 in the same manner as previously described with reference to FIG. 1. The temperature in the furnace is measured by a thermocouple 16 which is of conventional type and as is well known produces, in addition to the desired signal voltage corresponding to temperature, a noise voltage, sometimes designated as thermal noise, which is generally considered to be undesirable. The noise voltage has a gaussian random amplitude distribution and a spectral density of substantial uniformity over a very wide band. This noise voltage generated by the thermocouple 16 is, of course, at a relatively low amplitude in relation to the signal voltage.

In order to provide selective amplification for the noise voltage and the signal voltage from the thermocouple 16, an operational amplifier 18' is provided. The thermocouple is connected to the input of the amplifier 18' through an input resistor 40 and a shunt capacitor 42, and the amplifier output is fed back to the input through a feedback resistor 44. The input resistor 40 and capacitor 42 operate in the manner of a high pass filter and thus present low impedance to the noise voltage from the thermocouple. Accordingly, the operational amplifier 18' exhibits a very high gain in amplification of the noise voltage and a relatively low gain in amplification of the slowly varying thermocouple signal voltage. The output of the operational amplifier 18' may, if desired, be passed through a low-pass filter and thence to the input of the adder 20. Thus, the output of the operational amplifier 18' constitutes a superposed thermocouple signal voltage representing the temperature of the furnace 10 and a random noise voltage of the same order of magnitude and constituting a carrier voltage much the same as in the embodiment of FIG. 1. The set point voltage representing the desired temperature in the furnace 10 is derived from a potentiometer 22 and applied to the other input of the adder 20. The adder 20 combines the input voltages in a differential manner as indicated by the relative polarity symbols and produces an output voltage having a magnitude and polarity corresponding to the amount and direction of the difference between the signals applied to the input terminals of the adder. Thus, for explanatory purposes it may be considered that the signal voltage from the thermocouple 16 and the set point voltage from the potentiometer 22 will be combined differentially to produce an error voltage component in the output of the adder 10 which is superimposed upon the carrier voltage component derived from thermocouple 16 and supplied through the operational amplifier 18' and the adder 20. Thus, the error voltage component will have a magnitude and polarity depending upon the extent and direction of deviation of the actual temperature in furnace 10 from the desired temperature. The output of the adder 20 constitutes a switching voltage and is applied to one input of the pulse width modulator 30, the other input of which is connected to a point of reference potential or ground as indicated. Accordingly, in the same manner of operation as described with reference to FIG. 1, the modulator 30 responds to the switching voltage applied to its input and produces an output pulse when the input voltage is greater than the reference voltage and produces zero output when the input switching voltage is less than the reference voltage. By reason of the character of the carrier voltage, i.e., random amplitude distribution, the pulse width modulator exhibits variable gain and variable pulse rate as functions of the error voltage. When the error voltage is large, the gain will be low and the output pulses will be of relatively long duration and of a low repetition rate. When the error voltage is small, the gain will be high and the output pulses will be of short duration and high repetition rate. These pulses are applied to the power amplifier 32 which in turn is connected to the energizing coil of the contactor 14 which operates as an on-off control device. On the occurrence of each pulse the contactor closes the circuit between the alternating current source 13 and the heating element 12 in the furnace 10 to thus regulate the temperature at the desired value.

Figure 5:
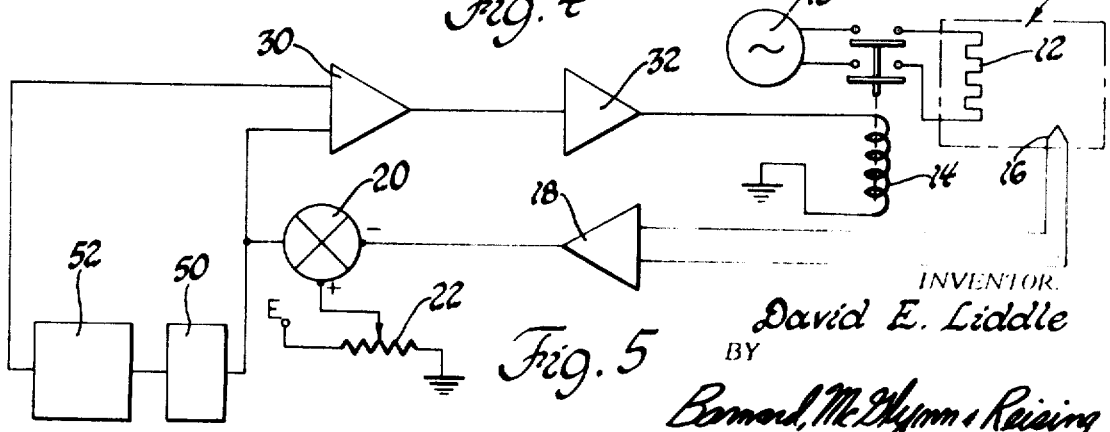

Referring now to FIG. 5 there is shown another embodiment of the invention wherein the desired carrier voltage is produced by a variable frequency oscillator. In this embodiment of the invention the control system is adapted to regulate the temperature of the furnace 10 at a desired value in the same manner as the systems previously described. Accordingly, the actual temperature in the furnace is sensed by the thermocouple 16 and the signal voltage thereof is applied through an amplifier 18 to one input of an adder 20. The set point voltage corresponding to the desired value of temperature in the furnace is developed by a potentiometer 22 and applied to the other input of the adder 20. The output of the adder 20 which corresponds to the difference of the two input voltages is the error voltage having a magnitude and polarity corresponding to the extent and direction of the deviation of the actual temperature from the desired temperature. The error voltage is applied to one input of the pulse width modulator 30 and may be regarded as a variable reference voltage therefor. The error voltage is also used to control the generation of a carrier voltage and for this purpose the output of the adder 20 is applied through a nonlinear circuit device 50 to a variable frequency oscillator 52, the output of which is applied to the other input of the pulse width modulator 30. The oscillator 52 which supplies the carrier voltage to the modulator 30 is suitably a voltage-controlled oscillator having an output frequency corresponding to the amplitude of the applied input voltage. For purposes of temperature control, as in the illustrative embodiment, the frequency range is suitably restricted to a very low value such as 1 cycle per second and below. When the error voltage and hence the control voltage for the oscillator 52 is at a low value or zero the oscillator operates at its maximum frequency and when the error voltage is relatively large value the oscillator produces a relatively low frequency with the amplitude of the oscillator output remaining substantially constant over its frequency range. The oscillator 52 may have any desired waveform as a function of time such as sinusoidal or triangular as may be desired for the particular application. The nonlinear circuit device 50 produces a control voltage for the oscillator 52 which is a nonlinear function of the error voltage. The nonlinear function is preferably such that it will produce a frequency variation as a function of error voltage which is similar to the functional relationship shown in FIG. 3c. Thus, the carrier or switching voltage supplied from the oscillator 52 increases in pulse rate or frequency as the error voltage decreases and remains substantially constant in amplitude. Accordingly, with the carrier voltage from the oscillator 52 varying in a periodic manner about a zero value suitably ground and applied to one input of the modulator 30, the modulator will exhibit both the variable gain and a variable pulse rate as a function of error voltage.

In this embodiment the modulator 30 is responsive to and effectively combines the error voltage and carrier voltage to produce an output when the summation exceeds a reference voltage. In this embodiment the carrier voltage may be regarded as the switching voltage and the error voltage as the reference voltage; alternately, the summation may be taken as the switching voltage and ground potential may be used as the reference. When the error voltage is large, the frequency of the carrier voltage will be relatively low and the amplitude thereof will exceed the magnitude of the error voltage, i.e., it will be more positive than the error voltage over a substantial portion of each cycle. Therefore, the output pulses from the modulator 30 with a large error voltage will be of relatively long duration and low frequency. With a small error voltage the oscillator 52 will produce a relatively high frequency carrier voltage and the amplitude thereof will be more positive than the error voltage over only a small portion of each cycle. Therefore, the output pulses of the modulator will be of relatively high frequency and of relatively short duration. When the error voltage is reduced to zero the carrier voltage will be of maximum frequency and will be more positive than the error voltage 50 percent of the time and accordingly the pulses from the modulator will be at maximum frequency and a pulse duration equal to the time interval between pulses. The output pulses of the modulator are amplified by the power amplifier 32 and applied to the contactor 14 in the manner previously described. Accordingly, the contactor connects the alternating current source 13 with the heating element 12 upon the occurrence of each pulse. Thus, when the error voltage is large with the attendant low pulse rate and long pulse duration, the maximum rate of temperature correction is produced with a minimum rate of switching or cycling of the contactor 14. Accordingly, the wear and tear on the contactor is minimized and its useful life is extended with no detrimental effect in the operation of the control system. On the other hand, when the error voltage is small with the attendant high average pulse rate and short duration, the control system affords maximum sensitivity to small changes in error voltage or temperature so as to maintain a high degree of accuracy in the regulation.

Although the description of this invention has been given with respect to particular embodiments thereof, it is not to be construed in a limiting sense. Many variations and modifications of the invention will now occur to those skilled in the art. For a definition of the invention, reference is made to the appended claims.

The embodiments of the invention in which I claim an exclusive property or privilege are defined as follows:

1. A feedback control system comprising an on-off control device for maintaining a variable quantity at a predetermined value, means for developing a signal voltage corresponding to the value of said variable quantity, means for developing a carrier voltage, means responsive to the signal voltage and the carrier voltage for developing a switching voltage having a repetition rate which varies inversely with the deviation of the signal voltage from a desired value thereof, means for comparing said switching voltage with a reference voltage and producing a voltage pulse having a duration corresponding to the time the switching voltage is greater than the reference voltage, and means responsive to said voltage pulse for energizing said control device so that it is maintained in an on condition for the duration of said pulse and in an off condition in the absence of said pulse whereby said control device is operated at a variable rate between the on and off conditions, said rate being relatively low when the deviation is high and being relatively high when said deviation is low.

2. A feedback control system comprising; an on-off control device adapted to maintain a variable quantity at a regulated value, a pulse width modulator responsive to a switching voltage for producing control pulses each of which has a duration corresponding to the time the switching voltage exceeds a predetermined amplitude, means for producing an error voltage corresponding to the deviation of the variable quantity from a desired value, means for producing a carrier voltage having a gaussian random amplitude distribution and a substantially uniform spectral density over a limited bandwidth, and means for combining the error voltage and the carrier voltage to produce said switching voltage whereby said control pulses have a pulse repetition rate which increases as the error voltage decreases and whereby said switching voltage exceeds said predetermined amplitude by an amount which increases with the value of said error voltage.

3. The invention as defined in claim 2 wherein said control device is an electromechanical contactor having a useful life limited by the number of switching cycles, said cycle rate being dependent upon the pulse rate of said modulator.

4. The invention as defined in claim 3 wherein said variable quantity is the temperature of a furnace or the like and the means for producing the error voltage includes a thermocouple in said furnace.

5. For use in a control system, a pulse width modulator responsive to a switching voltage for producing control pulses each having a duration corresponding to the time the switching voltage exceeds a predetermined amplitude, means for producing a signal voltage corresponding to the value of temperature of a controlled medium, selective means for amplifying the noise voltage generated by said thermocouple, means for developing a set point voltage corresponding to the desired value of said temperature, means for combining said signal voltage and said set point voltage for developing an error voltage corresponding to the deviation of the temperature from said desired value, and means responsive to the error voltage and said amplified noise voltage and adapted to produce an output when the summation thereof exceeds a reference voltage whereby said control pulses therefrom will have a pulse rate which increases as the error voltage decreases.

6. The invention as defined in claim 5 wherein said noise has a gaussian random amplitude distribution over a limited bandwidth.

7. A feedback control system comprising an on-off control device for maintaining the temperature of a controlled medium at a predetermined value, a thermocouple in said medium for producing a signal voltage corresponding to the temperature thereof, selective amplifying means connected to said thermocouple for amplifying the inherent noise of said thermocouple, means for developing a set point voltage corresponding to the desired value of said temperature, means for combining said signal voltage and said set point voltage for developing an error voltage corresponding to the deviation of the temperature from the desired value, means responsive to the error voltage and said amplified noise voltage and adapted to produce an output pulse when the summation thereof exceeds a reference voltage whereby the pulse rate generated by said last-named means increases as said error voltage decreases, and means connected with said last-mentioned means for energizing said control device to cause it to assume an on condition for the duration of each said pulse and an off position condition in the absence of said pulse.

8. the invention as defined in claim 7 wherein said control device is an electromechanical contactor having a useful life determined by the number of cycles of operation.

9. In a control system, means for developing a signal voltage corresponding to the value of a variable quantity, means for developing a set point voltage corresponding to the desired value of said variable quantity, means for combining said signal voltage and said set point voltage to develop an error voltage corresponding to the deviation from the desired value, a variable frequency oscillator for developing a carrier voltage, means responsive to the error voltage and connected with the oscillator for varying the frequency thereof inversely with the error voltage, and means for comparing said carrier voltage with said error voltage and producing a voltage pulse having a duration corresponding to the time the carrier voltage plus said error voltage is greater than a reference voltage.

10. A feedback control system comprising an on-off control device for maintaining a variable quantity at a regulated value, means for producing a signal voltage corresponding to the value of the variable quantity, means for developing a set point voltage corresponding to the desired value of said variable quantity, means for combining said signal voltage and said set point voltage for developing an error voltage corresponding to the deviation of the variable quantity from said desired value, a voltage controlled variable frequency oscillator adapted to produce a carrier voltage, means including a nonlinear circuit device for applying said error voltage to said voltage controlled oscillator whereby said carrier voltage has a frequency which varies in a nonlinear fashion and inversely as a function of said error voltage, comparator means having one input connected to the said variable frequency oscillator and another input connected with said error voltage and adapted to produce an output pulse having a duration corresponding to the time the carrier voltage plus said error voltage is greater than a reference voltage whereby said output pulses have a pulse rate which increases as said error voltage decreases and means connected with said comparator means for energizing said control means to cause it to assume an on condition throughout the duration of each pulse and to assume an off position in the absence of a pulse.